US012513581B2

(12) United States Patent
Takeda et al.

(10) Patent No.: US 12,513,581 B2
(45) Date of Patent: Dec. 30, 2025

(54) RELAY APPARATUS, COMMUNICATION APPARATUS, CONTROL METHOD, AND COMPUTER-READABLE STORAGE MEDIUM FOR EXECUTING HANDOVER PROCESSING OF RELAY APPARATUS

(71) Applicant: KDDI CORPORATION, Tokyo (JP)

(72) Inventors: Hiroki Takeda, Tokyo (JP); Yanwei Li, Tokyo (JP)

(73) Assignee: KDDI CORPORATION, Tokyo (JP)

( * ) Notice: Subject to any disclaimer, the term of this patent is extended or adjusted under 35 U.S.C. 154(b) by 460 days.

(21) Appl. No.: 18/080,304

(22) Filed: Dec. 13, 2022

(65) Prior Publication Data

US 2023/0115364 A1 Apr. 13, 2023

Related U.S. Application Data

(63) Continuation of application No. PCT/JP2021/024128, filed on Jun. 25, 2021.

(30) Foreign Application Priority Data

Jun. 26, 2020 (JP) .................................. 2020-110808

(51) Int. Cl.
*H04W 36/00* (2009.01)
*H04W 76/30* (2018.01)

(52) U.S. Cl.
CPC ....... *H04W 36/0079* (2018.08); *H04W 76/30* (2018.02)

(58) Field of Classification Search
CPC ............. H04W 36/0079; H04W 76/30; H04W 36/0055; H04W 84/047
See application file for complete search history.

(56) References Cited

U.S. PATENT DOCUMENTS

| 10,028,186 | B1 * | 7/2018 | Marupaduga ....... H04W 36/304 |
| 11,375,527 | B1 * | 6/2022 | Eyuboglu .......... H04B 7/15528 |
| 2019/0037414 | A1 | 1/2019 | Saito et al. |
| 2020/0267545 | A1 * | 8/2020 | Chang .................. H04W 12/04 |
| 2021/0013959 | A1 | 1/2021 | Yuan et al. |
| 2021/0219368 | A1 | 7/2021 | Fujishiro et al. |
| 2021/0227435 | A1 | 7/2021 | Hsieh |

(Continued)

FOREIGN PATENT DOCUMENTS

| WO | WO-2017/130495 A1 | 8/2017 |
| WO | WO-2018/201487 A1 | 11/2018 |

(Continued)

OTHER PUBLICATIONS

3rd Generation Partnership Project; Technical Specification Group Radio Access Network; NR; Study on Integrated Access and Backhaul; Release 16; 3GPP, TR38.874, V16.0.0, Dec. 2018, 111 pages.

(Continued)

*Primary Examiner* — Kibrom T Hailu
(74) *Attorney, Agent, or Firm* — Foley & Lardner LLP (57) ABSTRACT

A relay apparatus that relays communication between a base station apparatus and a communication apparatus that is connected to the base station apparatus executes, in a case where the relay apparatus performs a handover to another base station apparatus, control so as to withhold transmitting/receiving a signal for a handover of the communication apparatus between the communication apparatus and the base station apparatus while the relay apparatus is not successful in a handover.

13 Claims, 3 Drawing Sheets

(56) References Cited

U.S. PATENT DOCUMENTS

| | | |
|---|---|---|
| 2021/0360439 A1 | 11/2021 | Akl et al. |
| 2022/0030483 A1* | 1/2022 | Cheng ............. H04W 36/00838 |
| 2022/0141732 A1* | 5/2022 | Wu ................... H04W 36/0077 |
| | | 370/331 |
| 2022/0166703 A1* | 5/2022 | Xu .......................... H04L 61/50 |
| 2022/0174564 A1 | 6/2022 | Fujishiro |
| 2022/0191760 A1* | 6/2022 | Kim ...................... H04L 1/1812 |
| 2022/0361067 A1* | 11/2022 | Koskinen ........... H04B 7/15528 |
| 2023/0059975 A1* | 2/2023 | Wu ....................... H04W 36/362 |
| 2023/0089657 A1 | 3/2023 | Ishii |
| 2023/0164658 A1 | 5/2023 | Ishii |
| 2023/0247495 A1 | 8/2023 | Teyeb et al. |

FOREIGN PATENT DOCUMENTS

| | | |
|---|---|---|
| WO | WO-2019/246446 A1 | 12/2019 |
| WO | WO-2020/093333 A1 | 5/2020 |
| WO | WO-2021/033546 A1 | 2/2021 |

OTHER PUBLICATIONS

Enhancements to Integrated Access and Backhaul for NR, Qualcomm, 3GPP, RP-193251, Dec. 2019, 5 pages.

JP Office Action issued in corresponding Japanese Patent Application No. 2020-110808 dated Jan. 19, 2024 (8 pages).

U.S. Appl. No. 18/080,308, filed Dec. 13, 2022, Takeda, Hiroki; Li, Yanwei.

U.S. Appl. No. 18/080,318, filed Dec. 13, 2022, Takeda, Hiroki; Li, Yanwei.

U.S. Appl. No. 18/080,324, filed Dec. 13, 2022, Takeda, Hiroki; Li, Yanwei.

Chinese Office Action for Chinese Patent Application No. 202180044487.1 dated Sep. 6, 2024 (18 pages).

US Non-Final Office Action for U.S. Appl. No. 18/080,318 dated Jul. 16, 2025 (14 pages).

* cited by examiner

RELAY APPARATUS, COMMUNICATION APPARATUS, CONTROL METHOD, AND COMPUTER-READABLE STORAGE MEDIUM FOR EXECUTING HANDOVER PROCESSING OF RELAY APPARATUS

CROSS-REFERENCE TO RELATED APPLICATION(S)

This application is a continuation of International Patent Application No. PCT/JP2021/024128 filed on Jun. 25, 2021, which claims priority to and the benefit of Japanese Patent Application No. 2020-110808 filed Jun. 26, 2020, the entire disclosures of which are incorporated herein by reference.

BACKGROUND OF THE INVENTION

Field of the Invention

The present invention relates to a handover technique of a relay apparatus that relays communication between a base station apparatus and a terminal apparatus.

Description of the Related Art

In 3rd Generation Partnership Project (3GPP), a technique for applying, to a backhaul link, a method for a terminal apparatus to access a network, and making the method usable has been considered (see 3GPP, TR38.874, V16.0.0, December 2018). This technique is called "Integrated Access and Backhaul (IAB)". A relay apparatus called "IAB node" establishes connection to a 5G base station apparatus (IAB donor) using a wireless link, for example. At this time, the IAB node may be directly connected to the IAB donor by establishing a wireless link, or may be indirectly connection to the IAB donor by establishing a wireless link to another IAB node connected directly or indirectly to the IAB donor. At this time, the IAB node functions as a terminal apparatus connected to the base station apparatus, and thereby establishes wireless connection to the above-mentioned other apparatus (upstream apparatus) on the IAB donor side. In addition, after connection to the IAB donor has been established, the IAB node can establish connection to another IAB node or a terminal apparatus that is to be connected to the IAB donor. In this case, the IAB node operates in a similar manner to the base station apparatus, and establishes wireless connection to a terminal apparatus or another IAB node that operates as a terminal apparatus (downstream apparatus). In this manner, the IAB node has a terminal function (MT, Mobile Termination) and a function (DU, Distributed Unit) for performing an operation similar to that of a base station apparatus, and can relay communication between an upstream apparatus and a downstream apparatus using these functions.

In 3GPP release 17, starting consideration on a topology change technique that is accompanied by a switch of an IAB donor, namely a connection partner of an IAB node has been proposed (3GPP, RP-193251, December 2019). With this technique, when an IAB node installed in a mobile object such as a train or a bus moves, it is possible to maintain communication of the IAB donor itself and communication of another apparatus connected to the IAB donor.

SUMMARY OF THE INVENTION

The present invention provides a technique for streamlining processing that is performed when an IAB node switches a connection destination thereof, namely an IAB donor.

A relay apparatus according to one mode of the present invention is a relay apparatus that relays communication between a base station apparatus and a communication apparatus that is connected to the base station apparatus, and includes: one or more processors; and one or more memories that store a computer-readable instruction for causing, when executed by the one or more processors, the relay apparatus to: execute, in a case where the relay apparatus performs a handover to another base station apparatus, control so as to withhold transmitting/receiving a signal for a handover of the communication apparatus between the communication apparatus and the base station apparatus while the relay apparatus is not successful in a handover.

A communication apparatus according to another mode of the present invention is a communication apparatus that is to be connected to a base station apparatus via a relay apparatus, and includes: one or more processors; and one or more memories that store a computer-readable instruction for causing, when executed by the one or more processors, the communication apparatus to: transmit, in a case where the relay apparatus performs a handover to another base station apparatus, a second signal for a handover of the communication apparatus to the relay apparatus, after receiving a first signal for a handover of the communication apparatus, and withhold transmitting the second signal until receiving, from the relay apparatus, information indicating that a condition on which withheld transmission/receiving of a signal for a handover of the communication apparatus is to be released has been met.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain principles of the invention.

DESCRIPTION OF THE EMBODIMENTS

Hereinafter, embodiments will be described in detail with reference to the attached drawings. Note, the following embodiments are not intended to limit the scope of the claimed invention, and limitation is not made to an invention that requires a combination of all features described in the embodiments. Two or more of the multiple features described in the embodiments may be combined as appropriate. Furthermore, the same reference numerals are given to the same or similar configurations, and redundant description thereof is omitted.

System Configuration

Figure 1:
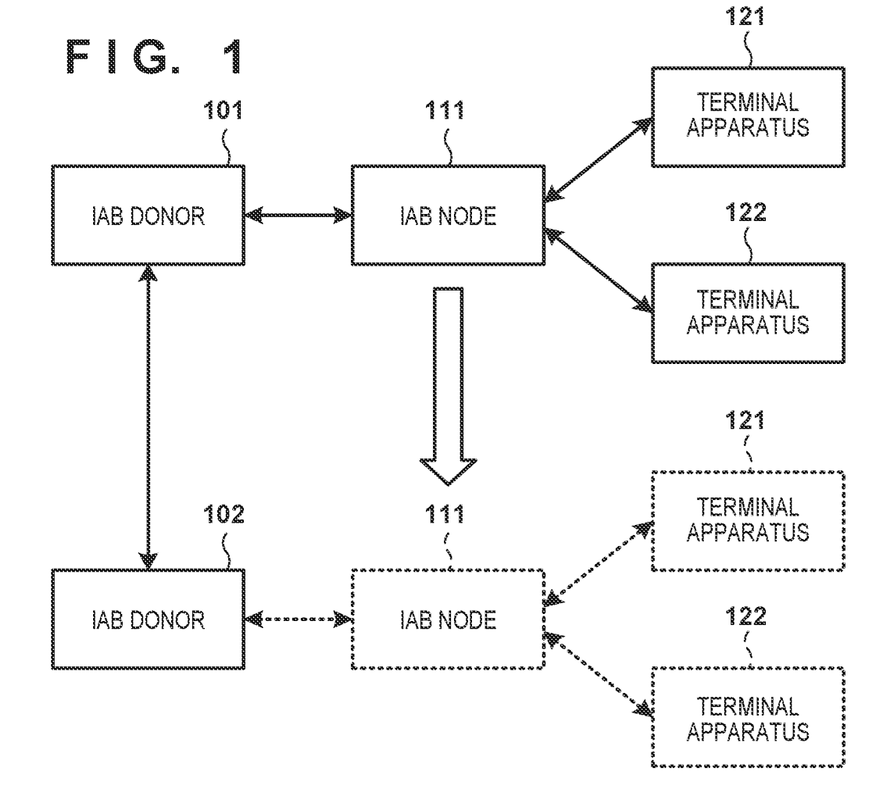
FIG. 1 is a diagram showing an exemplary configuration of a wireless communication system.

FIG. 1 shows an exemplary configuration of a wireless communication system according to the present embodiment. The wireless communication system according to the present embodiment is a relay transmission system that is based on Integrated Access and Backhaul (IAB) stipulated in 3GPP, and is constituted by an IAB donor 101 and IAB node 111. The IAB node 111 is a relay apparatus that relays communication between the IAB donor 101 and a terminal apparatus 121 or a terminal apparatus 122. That is to say, the terminal apparatus 121 or the terminal apparatus 122 is connected to the IAB donor 101 via the IAB node 111. Note that it may be interpreted that the IAB donor functions as a base station apparatus, and the IAB node functions as a relay apparatus. In the present embodiment, due to movement of the IAB node 111, deterioration in the quality of communication with the IAB donor 101 connected to the IAB node 111, or the like, connection to the IAB donor 101 is switched to connection to another IAB donor, namely an IAB donor 102 (a handover is performed).

The terminal apparatus 121 and the terminal apparatus 122 are connected to the IAB donor 101 via the IAB node 111. Therefore, in accordance with the IAB node 111 performing a handover to the IAB donor 102, the terminal apparatus 121 and the terminal apparatus 122 also require processing for changing a connection destination. Thus, the IAB donor 101 separately generates a control signal for a handover of the IAB node 111 and control signals for a handover of communication apparatuses (terminal apparatuses or other IAB nodes) connected downstream of the IAB node 111, and transmits the generated control signals to the IAB donor 102 that is a handover destination. Note that the control signals for a handover of each of the terminal apparatuses (the IAB node 111, the terminal apparatus 121, and the terminal apparatus 122) may include identification information (ID) and the name of the terminal apparatus, and information regarding a connection parameter that has been used by the apparatus, for example. Note that this control signal corresponds to a Handover Request message that is transmitted from a base station apparatus that is a handover source to a base station apparatus that is a handover destination. Note that, having transmitted this control signal, the IAB donor 101 may erase information regarding the IAB node 111 and the communication apparatuses (terminal apparatuses and other IAB nodes) connected downstream of the IAB node 111.

Note that the above-mentioned identification information (ID) can be a ReestabUE-Identity derived (calculated, for example) from Cell Radio Network Temporary Identifier (C-RNTI), or C-RNTI and physical cell ID (physCellId), which is an identifier that is allocated to each of the terminal apparatuses and IAB nodes by the base station apparatus. In addition, if a communication apparatus connected downstream of the IAB node 111 is an IAB node, Global NG-RAN Node ID or IP address allocated to the IAB node (as a 5G wireless access network node) may be used as identification information (ID).

Upon receiving the control signals for a handover of the IAB node 111, the terminal apparatus 121, and the terminal apparatus 122, the IAB donor 102 that is a handover destination transmits response signals to the respective control signals, to the IAB donor 101. A "response signal" as mentioned herein may include information regarding a connection parameter that is to be used by each of the IAB node and the terminal apparatuses after a handover, and that is determined, for example, based on a connection parameter that has been used by the node or apparatus. Note that this response signal may correspond to a Handover Request Acknowledge message that is transmitted from a base station apparatus that is a handover destination to a base station apparatus that is a handover source in a conventional method.

On receiving the response signals, the IAB donor 101 transmits, to the IAB node 111, a control signal for a handover of the IAB node 111 and control signals for a handover of the communication apparatuses connected downstream of the IAB node 111. Note that, here, a control signal for a handover corresponds to a conventional RRC Reconfiguration message, for example. Here, the control signal for the IAB node 111 may include information indicating that processing (for example, random access processing) for establishing synchronization with the connection destination to which a switch is to be made (IAB donor B) is necessary.

On the other hand, there is no change in the partner apparatus (for example, the IAB node 111, for the terminal apparatus 121 and the terminal apparatus 122) to which the communication apparatuses connected downstream of the IAB node 111 are directly connected, and thus the control signals for these apparatuses may include information indicating that synchronization establishment processing is not necessary. Therefore, upon receiving this control signal, each of the communication apparatuses connected downstream of the IAB node 111 transmits a response message (RRC Reconfiguration Complete message) to the IAB node 111 without executing random access processing or the like, and receive a process response in response to the message, and thereby it can be determined that a handover was successful. At this time, the control signal received by each of the apparatuses via the IAB node 111 includes information regarding a connection parameter for connection to the IAB donor 102, and thus a status is achieved based on which it can be determined that connection to the IAB donor 102 has been established.

However, the communication apparatuses connected downstream of the IAB node 111 can maintain connection to the IAB node 111 as is, but there may be cases where the IAB node 111 cannot establish connection to the IAB donor 102. That is to say, there may be cases where the IAB node 111 fail in a handover (for example, random access). At this time, the IAB node 111 can execute processing for reconnection with another IAB donor (or another IAB node that relays communication with the IAB donor), to establish connection. In this case, the IAB donor that is a reconnection destination of the IAB node 111 and the IAB donor considered to be connected to the communication apparatuses connected downstream of the IAB node 111 may be different. Due to this mismatch, there may be cases where the IAB node 111 cannot appropriately maintain functions of a relay apparatus, for example, occurrence of a mismatch of connection parameters.

In light of such circumstances, when a first control signal for a handover of the IAB node 111 and second control signals for the communication apparatuses connected downstream of the IAB node 111 are received from the IAB donor 101 that is a handover source, the IAB node 111 according to the present embodiment withholds transferring the second control signals. While withholding transferring the second control signals, the IAB node 111 executes processing for performing a handover to the IAB donor 102 that is a handover destination. Here, the IAB node 111 requires establishment of synchronization processing, and thus executes random access processing (transmits a random access preamble/receives a random access response). Note that random access processing as mentioned herein may be 4-step random access processing or 2-step random access processing. Also, the "random access" as mentioned herein may be a contention-based random access (CBRA), or may be contention-free random access (CFRA). After executing random access processing and establishing connection to the IAB donor 102 that is a handover destination, the IAB node 111 transmits the second control signals withheld to be transferred, to the communication apparatuses connected downstream of the IAB node 111. Accordingly, after the IAB node 111 has performed a handover successfully, the control signals for a handover of the communication apparatuses connected downstream of the IAB node 111 are transmitted, and thus it is possible to prevent a mismatch between the IAB donor that is a connection destination of the IAB node 111 and a donor that is a connection destination of the communication apparatuses connected downstream thereof. Note that, if a handover fails, the IAB node 111 may discard the second control signals. In this case, after reestablishing connection, the IAB node 111 may execute handover processing of the downstream communication apparatuses.

Note that the IAB node 111 may recognize that a handover was successful, by receiving a Random Access Response from the base station apparatus that is a handover destination, or can also recognize that a handover was successful, by receiving a contention resolution. In addition, the IAB node 111 may recognize that a handover failed when a timer that starts when handover processing starts expires, or in accordance with the number of times the Random Access Preamble was transmitted exceeding a predetermined value.

Note that, if a handover was successful, after path settings and the like for relay transmission are complete between the IAB node 111 and the IAB donor 102 that is a handover destination of the IAB node 111, the IAB node 111 may transfer the withheld second control signals. A configuration can be adopted in which, for example, after an F1 interface has been established, the withheld second control signals are transferred.

Moreover, for example, the IAB node 111 may transmit the second control signals without withholding them, receive third control signals that are transmitted from the downstream communication apparatuses in response to the second control signals, and attempt a handover before transmitting response signals after receiving the third control signals. When receiving a third control signal, if a handover was successful, the IAB node 111 may transmit a response signal to an apparatus that has transmitted the third control signal. On the other hand, when receiving a third control signal, if a handover was not successful, the IAB node 111 may withhold transmitting a response signal. In this case, the IAB node 111 may transmit a response signal after a handover is performed successfully. Note that the third control signal may be an RRC Reconfiguration Complete message, and the response signal may be an RLC ACK. Note that "RLC" is an acronym for Radio Link Control, and "RLC ACK" is a positive response of an RLC layer.

A case has been described in which, in the above-described processing, the IAB node 111 withholds transmitting predetermined control signals (for example, RRC Reconfiguration messages) for a handover of downstream communication apparatuses. In contrast, the IAB node 111 may withhold transmitting predetermined signals (for example, RRC Reconfiguration Complete messages) to the communication apparatuses downstream of the IAB node 111 until a handover is performed successfully. In this case, when a handover is complete, the IAB node 111 may notify the communication apparatuses connected downstream of the IAB node 111, of information indicating that a handover has been successful. Note that this information may be notified after the IAB node 111 completes settings related to a relay path. That is to say, the IAB node 111 may notify the downstream communication apparatuses of information indicating that a condition on which withheld transmission/receiving of signals for a handover of the communication apparatuses connected downstream of the IAB node 111 is to be released has been met. The communication apparatuses connected downstream of the IAB node 111 then transmit a predetermined signal to the IAB node 111 in accordance with being notified of information indicating a handover was successful. On the other hand, if a handover was not successful, the IAB node 111 may notify the communication apparatuses connected downstream of the IAB node 111, of information indicating that a handover failed. The communication apparatuses connected downstream of the IAB node 111 may then discard the predetermined controls signals for a handover received from the IAB node 111, in accordance with being notified of the information indicating that a handover failed.

In the above-described manner, in a case where the IAB node 111 failed in a handover, it is possible to prevent the occurrence of a mismatch of connection destination, namely IAB donor due to the communication apparatuses connected downstream of the IAB node 111 determining that a handover was successful.

Note that the IAB node 111 may perform control so as to prevent a new terminal apparatus from starting processing for connection to the IAB node 111 until processing of a handover of the IAB node 111 itself is complete. The IAB node 111 may set information (for example, cellBarred) indicating that connection to a cell cannot be made, in a notification signal (for example, System Information Block Type 1) that is transmitted by the IAB node 111, for example, in accordance with receiving a control signal for a handover (for example, RRC Reconfiguration message) from the IAB donor 101 that is a handover source. Accordingly, it is possible to prevent signaling performed in order to newly connect a terminal apparatus from being wasted when a handover fails.

Note that FIG. 1 illustrates a case in which the IAB node 111 is directly connected to the IAB donor 101 or the IAB donor 102, but may also be connected to the IAB donor via another IAB node. In addition, the terminal apparatus 121 or the terminal apparatus 122 may be another IAB node. In addition, FIG. 1 shows only a small number of IAB donors, IAB nodes, and terminal apparatuses, but there may be a larger number of IAB donors, IAB nodes, and terminal apparatuses without loss of generality.

Apparatus Configuration

Figure 2:
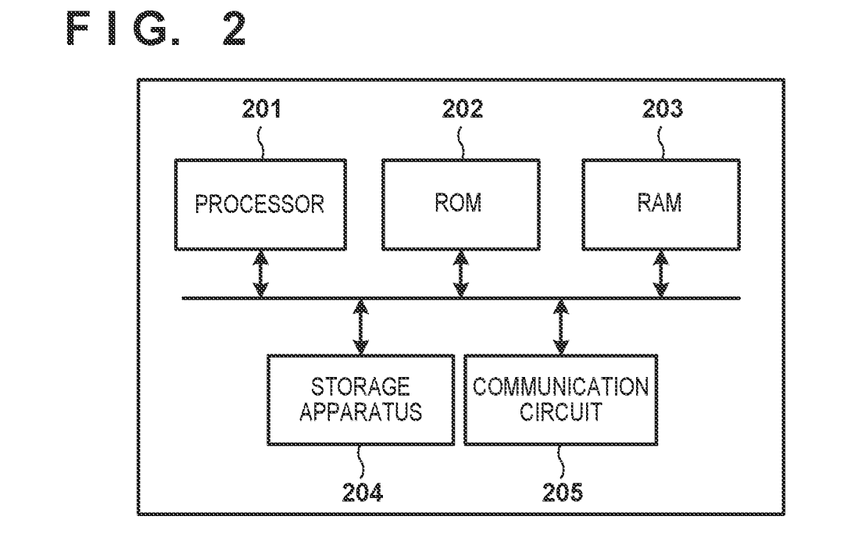
FIG. 2 is a diagram showing an exemplary hardware configuration of an IAB node and a communication apparatus connected downstream of the IAB node.

Next, the configuration of an IAB node and a terminal apparatus that execute processing such as that described above will be described. FIG. 2 shows an exemplary hardware configuration of an IAB node or a terminal apparatus. The IAB node and the terminal apparatus each include a processor 201, a ROM 202, a RAM 203, a storage apparatus 204, and a communication circuit 205, as an example. In the IAB node and the terminal apparatus, for example, a computer-readable program that realizes the above-described functions of the IAB node and the terminal apparatus, and is recorded in one of the ROM 202, the RAM 203, and the storage apparatus 204 is executed by the processor 201. Note that, the processor 201 may be replaced with one or more processors such as an ASIC (application-specific integrated circuit), FPGA (Field Programmable Gate Arrays), and a DSP (digital signal processor).

The processor 201 of the IAB node or the terminal apparatus controls the communication circuit 205 so as to perform communication with a partner apparatus (an IAB donor, an IAB node, a terminal apparatus, or the like), for example. Note that FIG. 2 shows a schematic diagram in which the IAB node or the terminal apparatus includes one communication circuit 205, but there is no limitation thereto. The IAB node may include a communication circuit for communicating with an IAB donor and a communication circuit for communicating with another IAB node and terminal apparatus, for example. In addition, the terminal apparatus may include a communication circuit for cellular communication and a communication circuit for communication conforming to another wireless standard.

Figure 3:
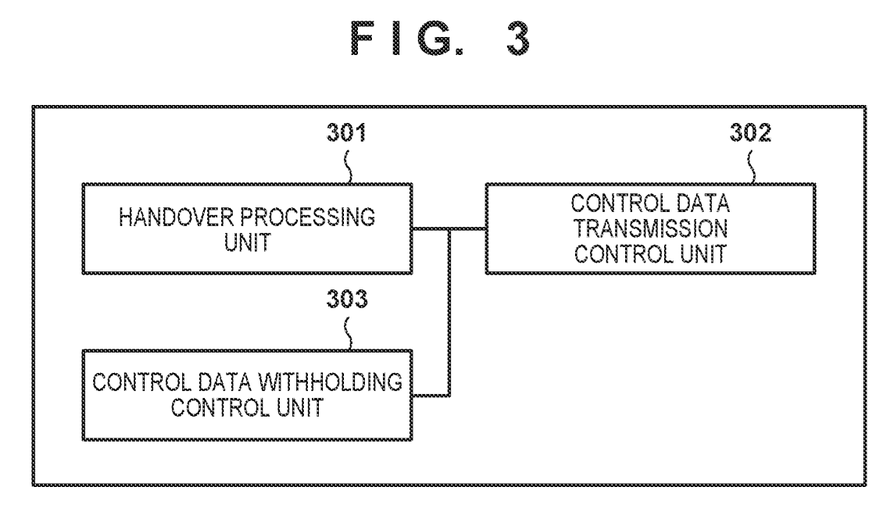
FIG. 3 is a diagram showing an exemplary functional configuration of an IAB node.

FIG. 3 shows an exemplary functional configuration of an IAB node. The IAB node is constituted by a handover processing unit 301, a control data transmission control unit 302, and a control data withholding control unit 303, for example. Note that the IAB node is configured to be capable of performing ordinary functions of an IAB node (terminal function and base station function) other than these as a matter of course. In addition, a portion or the entirety of the functional configuration may be realized by the processor 201 executing a program stored in the ROM 202 or the storage apparatus 204, for example. In addition, dedicated hardware that realizes this functional configuration may be prepared. In addition, the functional configuration in FIG. 3 may also be realized by a processor included in the communication circuit 205 executing a dedicated program, for example. In addition, some of the functions in FIG. 3 may be omitted, or a function in FIG. 3 may be replaced with another function that has similar capability.

The handover processing unit 301 executes various types of processing for when a handover accompanied by a change of a connection destination, namely an IAB donor due to movement or the like of the IAB node is executed. The handover processing unit 301 transmits a random access preamble to a specified IAB donor that is a handover destination, in accordance with receiving an RRC Reconfiguration message indicating that synchronization establishment processing is necessary, from the IAB donor that is a handover source, for example. When a random access response is received from the IAB donor that is a handover destination, the handover processing unit 301 transmits an RRC Reconfiguration Complete message to the IAB donor that is a handover destination, and completes a handover. Note that the handover processing unit 301 may also execute subsequent setting as a relay apparatus such as setting of a relay path.

When the IAB node executes handover processing, the control data transmission control unit 302 transmits control data for a handover of the communication apparatuses connected downstream of the IAB node itself. Note that the control data can be an RRC Reconfiguration message received from the IAB donor that is a handover source. The control data can also be a response signal (RLC ACK) to an RRC Reconfiguration Complete message that is received from a communication apparatus connected downstream of the IAB node. The control data withholding control unit 303 can execute control so as to withhold transmission of control data by the control data transmission control unit 302, for example. The control data withholding control unit 303 may withhold transmitting RRC Reconfiguration messages for a handover of the apparatuses connected downstream of the IAB node, to the communication apparatuses, until a handover of the IAB node itself is performed successfully, for example. Moreover, the control data transmission control unit 302 may be configured to transmit the RRC Reconfiguration messages for a handover of the apparatuses connected downstream of the IAB node, to the apparatuses, regardless of whether or not a handover of the IAB node itself was successful, for example. In this case, the control data withholding control unit 303 may withhold transmitting response signals (RLC ACK) to RRC Reconfiguration Complete messages from the downstream communication apparatuses.

Moreover, the control data withholding control unit 303 may perform control so as to withhold transmitting the RRC Reconfiguration Complete messages to the downstream communication apparatuses, until the IAB node performs a handover successfully. In this case, the control data transmission control unit 302 may be configured to transmit the RRC Reconfiguration messages for a handover of the apparatuses connected downstream of the IAB node to the communication apparatuses regardless of whether or not a handover of IAB node itself was successful. The control data withholding control unit 303 then causes the control data transmission control unit 302 to check whether the handover processing unit 301 performed a handover successfully or with a failure, and controls the control data transmission control unit 302 to transmit information indicating that the handover was successful or failed, to the downstream communication apparatuses. In a case where information indicating that the handover was successful is notified to the downstream communication apparatuses, the RRC Reconfiguration Complete messages are transmitted from the downstream communication apparatuses. In this case, the control data transmission control unit 302 transmits RLC ACK to the downstream communication apparatuses, and ends handover processing of the downstream communication apparatuses. On the other hand, if information indicating that a handover failed is notified to the downstream communication apparatuses, the downstream communication apparatuses discard the RRC Reconfiguration messages. In this case, the IAB node attempts reconnection to another IAB donor, and, in accordance with the IAB node successfully performing reconnection, the downstream communication apparatuses also attempt connection to the reconnection partner, namely an IAB donor. Note that the downstream communication apparatuses may execute processing for reconnection to an apparatus other than the IAB node.

Figure 4:
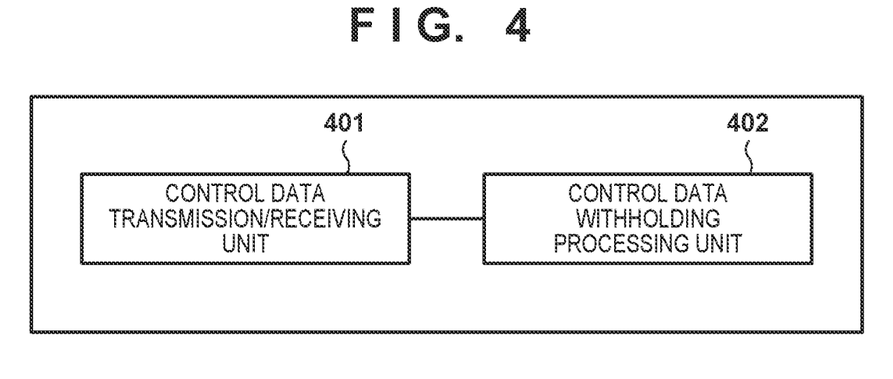
FIG. 4 is a diagram showing an exemplary functional configuration of a communication apparatus connected downstream of the IAB node.

FIG. 4 shows an exemplary functional configuration of a downstream communication apparatus (terminal apparatus or other IAB node) in a case where the downstream communication apparatus withholds transmitting an RRC Reconfiguration Complete message. This apparatus includes a control data transmission/receiving unit 401 and a control data withholding processing unit 402, for example. Note that this apparatus is configured to be capable of performing functions of a normal terminal apparatus or IAB node other than these as a matter of course. Note that, if this apparatus is an IAB node, the functions in FIG. 3 are also included as a matter of course. In addition, a portion or the entirety of the functional configuration may be realized by the processor 201 executing a program stored in the ROM 202 or the storage apparatus 204, for example. In addition, dedicated hardware that realizes this functional configuration may be prepared. In addition, the functional configuration in FIG. 4 may also be realized by a processor included in the communication circuit 205 executing a dedicated program, for example. In addition, some of the functions in FIG. 4 may be omitted, or a function in FIG. 4 may be replaced with another function that has similar capability.

The control data transmission/receiving unit 401 receives an RRC Reconfiguration message as control data for a handover of the apparatus that includes the control data transmission/receiving unit 401, from the upstream IAB node. Until information indicating that a handover was successful is received following the RRC Reconfiguration message, the control data withholding processing unit 402 withholds transmitting an RRC Reconfiguration Complete message in response to the RRC Reconfiguration message. The control data withholding processing unit 402 then releases withheld transmission in accordance with receiving information indicating that the control data transmission/receiving unit 401 has performed a handover successfully, and outputs, to the control data transmission/receiving unit 401, an instruction to transmit an RRC Reconfiguration Complete message. On the other hand, in a case where the control data transmission/receiving unit 401 receives information indicating that a handover failed, the control data withholding processing unit 402 discards the RRC Reconfiguration message received previously.

Flow of Processing

Figure 5:
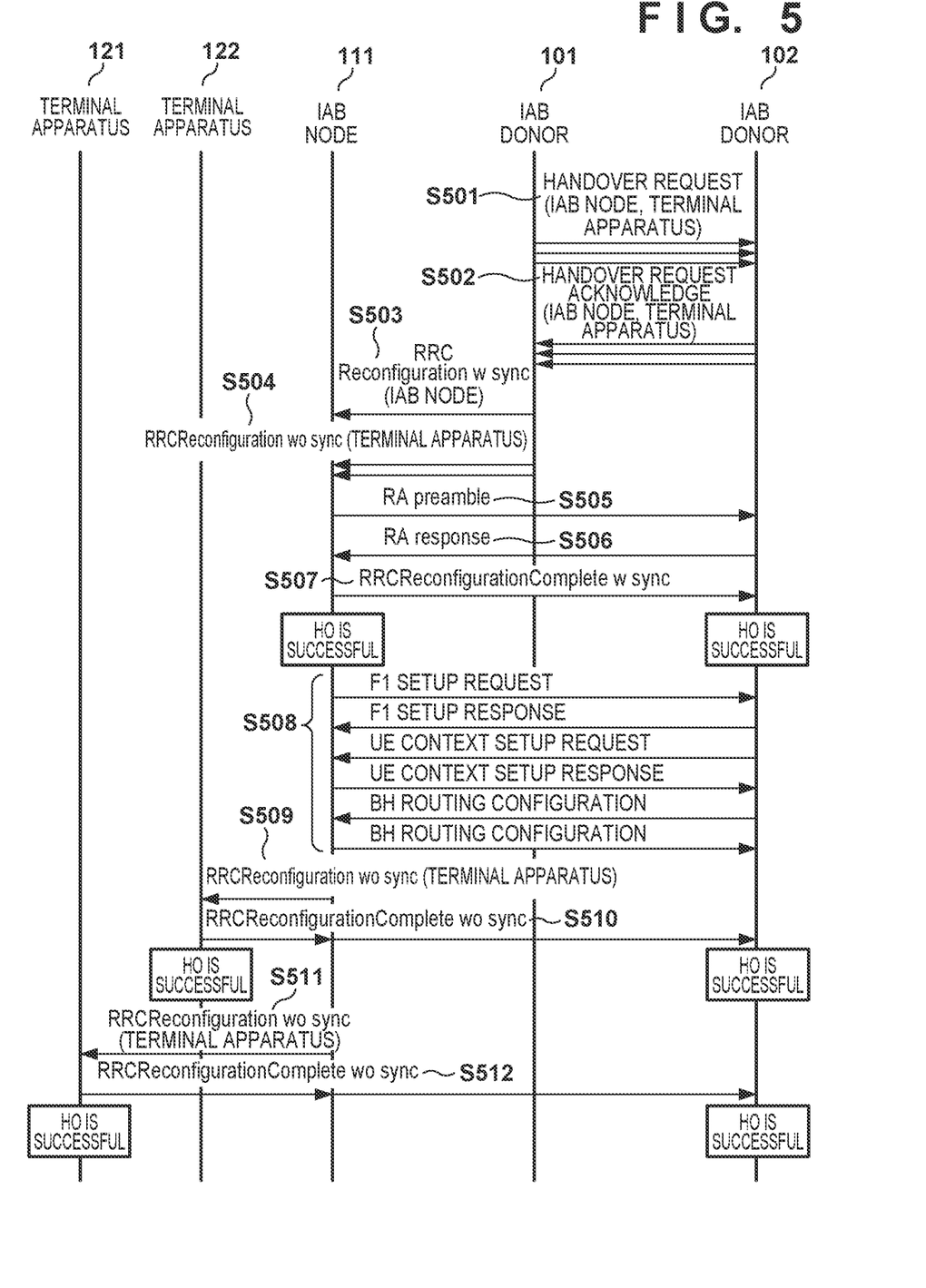
FIG. 5 is a diagram showing an example of flow of processing that is executed by a wireless communication system.

Next, an example of flow of processing that is executed by the wireless communication system will be described with reference to FIG. 5. Note that, here, an example of processing in a case where the IAB node 111 withholds transmitting an RRC Reconfiguration message from when a handover is started until when setting related to a relay path is complete will be described. However, this is merely exemplary, and, for example, after a handover is performed successfully, the IAB node 111 may withhold transmitting an RRC Reconfiguration message before setting related to a relay path is complete. In addition, the IAB node 111 may withhold transmitting RLC ACK, or may cause the downstream communication apparatuses to withhold transmitting RRC Reconfiguration Complete messages.

In this processing, first, the IAB donor 101 connected to the IAB node 111 determines that a handover of the IAB node 111 is to be performed, in accordance with deterioration in first wireless quality of a signal received by the IAB node 111 from the IAB donor 101, second wireless quality of a signal received by the IAB node 111 from the IAB donor 102 exceeding the first wireless quality by more than a predetermined level, or the like. The IAB donor 101 then specifies the communication apparatuses connected downstream of the IAB node 111, and generates Handover Request messages for the apparatuses, and a Handover Request message for the IAB node 111, and transmits the messages to the IAB donor 102 that is a handover destination (step S501). The IAB donor 102 obtains information such as connection parameters that are being used by the apparatuses, from the Handover Request messages for the respective apparatuses. The IAB donor 102 then determines connection parameters to be used by the apparatuses after a handover, and the like, generates Handover Request Acknowledge messages for the respective apparatuses, the messages including the information, and transmits the messages to the IAB donor 101 that is a handover source (step S502).

Upon receiving the multiplexed Handover Request Acknowledge messages, the IAB donor 101 generates RRC Reconfiguration messages for the IAB node 111 and the communication apparatuses connected downstream of the IAB node 111, based on the received messages, and transmits the generated messages to the IAB node 111 (steps S503 and S504). At this time, the RRC Reconfiguration message for the IAB node 111 may indicate that synchronization establishment processing such as random access processing is to be executed. On the other hand, the RRC Reconfiguration messages for the communication apparatuses connected downstream of the IAB node 111 may indicate that synchronization establishment processing such as random access processing is not to be executed. Note that, in FIG. 5, "w sync" indicates that synchronization establishment processing is necessary, and "wo sync" indicates that synchronization establishment processing is not necessary.

In this example, even when RRC Reconfiguration messages for the downstream communication apparatuses are received, the IAB node 111 temporarily withholds transferring the messages to the downstream communication apparatuses. Next, the IAB node 111 first attempts connection to the IAB donor 102 that is a handover destination. Specifically, the IAB node 111 executes random access processing and establishes synchronization with the IAB donor 102, based on the RRC Reconfiguration message for the IAB node 111 (steps S505 and S506). The IAB node 111 then transmits an RRC Reconfiguration Complete message for the IAB node 111 itself to the IAB donor 102 that is a handover destination (step S507), and completes a handover. The IAB node 111 then executes setting related to a relay path with the IAB donor 102 (step S508). The IAB node 111 transmits a request (F1 Setup Request) message for establishing an F1 interface to the IAB donor 102, and the IAB donor 102 transmits a response (F1 Setup Response) message to the request message, to the IAB node 111, for example. UE Context Setup Request and UE Context Setup Response are then transmitted/received, and routing setting of backhaul (BH) is executed.

When the setting related to a relay path is complete, the IAB node 111 transmits the RRC Reconfiguration messages for the downstream communication apparatuses received in step S504 and withheld to be transferred, to the downstream communication apparatuses (steps S509 and S511). Upon receiving RRC Reconfiguration Complete messages from the apparatuses, the IAB node 111 transfers the messages to the IAB donor 102 (steps S510 and S512). A handover between the IAB donor 102 and the downstream communication apparatuses is completed by transmitting/receiving the RRC Reconfiguration Complete messages. Note that a configuration may be adopted in which the IAB node 111 transmits RLC ACK to the downstream communication apparatuses (not illustrated), and completes handover processing, and the downstream communication apparatuses determines that a handover was successful, in accordance with receiving RLC ACK.

In this manner, in the present embodiment, when executing a handover, the IAB node 111 withholds transmitting messages to communication apparatuses connected downstream of the IAB node 111 itself, or causes those apparatuses to withhold transmitting messages, thereby preventing the downstream communication apparatuses from completing handover processing earlier. Accordingly, after a handover of the IAB node 111 on the upstream side is performed successfully, handover processing on the downstream side is completed, and thereby it is possible to prevent the occurrence of inconsistency in the IAB donor that is a connection destination (in other words, connection parameter) between the IAB node 111 and the downstream communication apparatuses.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A relay apparatus that relays communication between a base station apparatus and a communication apparatus that is connected to the base station apparatus, the relay apparatus comprising:
   one or more processors; and
   one or more memories that store a computer-readable instruction for causing, when executed by the one or more processors, the relay apparatus to:
   receive from the base station apparatus, in a case where the relay apparatus performs a handover to another base station apparatus, a Radio Resource Control (RRC) Reconfiguration message for handover of the communication apparatus that includes information indicating that the communication apparatus is not required to perform a random access procedure in a handover process of the communication apparatus; and
   transmit, to the communication apparatus, the received RRC Reconfiguration message.

2. The relay apparatus according to claim 1, wherein
   the relay apparatus receives a RRC Reconfiguration Complete message for handover of the communication apparatus that is transmitted, without performing the random access procedure, from the communication apparatus having received the RRC Reconfiguration message, and
   the relay apparatus transmits the received RRC Reconfiguration Complete message to the another base station apparatus.

3. The relay apparatus according to claim 2, wherein
   the relay apparatus transmits, to the communication apparatus, a response signal responsive to the RRC Reconfiguration Complete message.

4. The relay apparatus according to claim 2, wherein
   the RRC Reconfiguration message includes, as identification information of the communication apparatus, Cell Radio Network Temporary Identifier (C-RNTI) or ReestabUE-Id entity.

5. The relay apparatus according to claim 2, wherein
   the relay apparatus receives, from the base station apparatus, another RRC Reconfiguration message for handover of the relay apparatus that include information indicating that the relay apparatus is required to perform a random access procedure, and
   the relay apparatus transmits, after performing the random access procedure with the another base station apparatus based on reception of the another RRC Reconfiguration message, a RRC Reconfiguration Complete message for handover of the relay apparatus, to the another base station apparatus.

6. The relay apparatus according to claim 5, wherein
   the another RRC Reconfiguration message includes identification information of the relay apparatus that is associated with an Internet Protocol (IP) address.

7. A communication apparatus that is to be connected to a base station apparatus via a relay apparatus, comprising:
   one or more processors; and
   one or more memories that store a computer-readable instruction for causing, when executed by the one or more processors, the communication apparatus to:
   receive, in a case where the relay apparatus performs a handover to another base station apparatus, a Radio Resource Control (RRC) Reconfiguration message for handover of the communication apparatus that includes information indicating that the communication apparatus is not required to perform a random access procedure in a handover process of the communication apparatus; and
   transmit, without performing the random access procedure, an RRC Reconfiguration Complete message for handover of the communication apparatus, based on the received RRC Reconfiguration message.

8. The communication apparatus according to claim 7, wherein
   the communication apparatus receives, from the relay apparatus, a response signal responsive to the RRC Reconfiguration Complete message.

9. The communication apparatus according to claim 7, wherein
   the RRC Reconfiguration message includes, as identification information of the communication apparatus, Cell Radio Network Temporary Identifier (C-RNTI) or ReestabUE-Id entity.

10. A control method that is executed by a relay apparatus that relays communication between a base station apparatus and a communication apparatus that is connected to the base station apparatus, the method comprising:
    receiving from the base station apparatus, in a case where the relay apparatus performs a handover to another base station apparatus, a Radio Resource Control (RRC) Reconfiguration message for handover of the communication apparatus that includes information indicating that the communication apparatus is not required to perform a random access procedure in a handover process of the communication apparatus; and
    transmitting, to the communication apparatus, the received RRC Reconfiguration message.

11. A control method that is executed by a communication apparatus that is connected to a base station apparatus via a relay apparatus, comprising:
    receiving, in a case where the relay apparatus performs a handover to another base station apparatus, a Radio Resource Control (RRC) Reconfiguration message for handover of the communication apparatus that includes information indicating that the communication apparatus is not required to perform a random access procedure in a handover process of the communication apparatus; and
    transmitting, without performing the random access procedure, an RRC Reconfiguration Complete message for handover of the communication apparatus, based on the received RRC Reconfiguration message.

12. A non-transitory computer-readable storage medium that stores a program for causing a computer included in a relay apparatus, which relays communication between a base station apparatus and a communication apparatus that is connected to the base station apparatus, to:
    receive from the base station apparatus, in a case where the relay apparatus performs a handover to another base station apparatus, a Radio Resource Control (RRC) Reconfiguration message for handover of the communication apparatus that includes information indicating that the communication apparatus is not required to perform a random access procedure in a handover process of the communication apparatus; and
    transmit, to the communication apparatus, the received RRC Reconfiguration message.

13. A non-transitory computer-readable storage medium that stores a program for causing a computer included in a communication apparatus, which is connected to a base station apparatus via a relay apparatus;

receive, in a case where the relay apparatus performs a handover to another base station apparatus, a Radio Resource Control (RRC) Reconfiguration message for handover of the communication apparatus that includes information indicating that the communication apparatus is not required to perform a random access procedure in a handover process of the communication apparatus; and transmit, without performing the random access procedure, an RRC Reconfiguration Complete message for handover of the communication apparatus, based on the received RRC Reconfiguration message.

\* \* \* \* \*